United States Patent Office 3,288,852
Patented Nov. 29, 1966

3,288,852
ANTHRACENE DIALKANESULFONAMIDES
Joseph E. Dunbar, Midland, Mich., assignor to The Dow Chemical Company, Midland, Mich., a corporation of Delaware
No Drawing. Filed May 8, 1964, Ser. No. 366,152
5 Claims. (Cl. 260—556)

The present invention is directed to the novel 1,4,5,8-tetrahydro - 1,4:5,8 - dimethano - 9,10 - anthracene disulfonamides corresponding to the formula

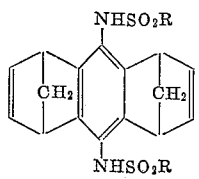

and the methods for their synthesis. In this and succeeding formulae, R represents a lower alkyl containing up to and including 4 carbon atoms. The 1,4,5,8-tetrahydro-1,4:5,8-dimethano-9,10-anthracene disulfonamides are crystalline solid materials which are of value as intermediates in the preparation of 1,4,5,8 - tetrahydro-1,4:5,8-dimethano - 9,10 - anthraquinone disulfonimides which are useful as parasiticides.

It has been discovered that the 1,4,5,8-tetrahydro-1,4:5,8 - dimethano - 9,10 - anthracene disulfonamides can be prepared in good yields by a process which involves the tertiary amine catalyzed aromatization of a 1,4,4a,5,8,9a - hexahydro - 1,4:5,8 - dimethano - 9,10-anthraquinone disulfonimides having the formula

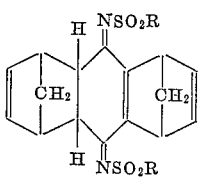

The aromatization is preferably carried out in the presence of an inert solvent as reaction medium. Suitable solvents include chloroform, carbon tetrachloride, benzene, toluene, xylene, methylene chloride or tetrachloroethane.

The reaction can be carried out at temperatures between —10° and 100° C. and preferably between 0° to 50° C. In a convenient method of operation, reaction conditions are maintained until there is a sustantial cessation in the formation of the solid product, indicating that the reaction is approaching completion.

The amounts of the reactants to be employed are not critical, some of the desired product being obtained when any amounts of starting materials are employed. It is essential that the tertiary amine catalyst be employed in at least catalytic amounts. Large amounts of the catalyst can be employed such as molecular proportions of the catalyst equal to twice the molecular proportions of the employed anthraquinone disulfonimide. However, the use of the catalyst in large amounts is not necessary nor is it desirable from the standpoint of economy. Suitable catalysts include pyridine, lutidine, picoline, quinoline, trialkylamines and N,N-dialkylanilines such as trimethylamine, tributylamine, dipropylmonoethylamine, diethylmonopropylamine, N,N - dimethylaniline, N,N-diamylaniline, N,N-dipropylaniline, N,N-diethylaniline and so forth. Preferred trialkylamines and N,N-dialkylanilines include those wherein alkyl is lower alkyl. In the present specification and claims lower alkyl is employed to refer to alkyl containing from 1 to 5 carbon atoms inclusive.

In carrying out the reaction, the anthraquinone disulfonimide and tertiary amine can be combined in any convenient order or fashion. However, it is preferred that the reactants be dispersed in an organic solvent. The reaction proceeds rapidly with the contacting and mixing of the reactants. For optimum yield, the reaction mixture is maintained at the reaction temperature until there is a substantial cessation in the formation of the solid product. The solid product which has formed during the reaction can be collected by conventional procedures such as filtration or decantation, and further purified by common procedures including washing or recrystallization from a common organic solvent.

In carrying out the novel process of the present invention it has been found to be unnecessary to isolate the 1,4,4a,5,8,9a-hexahydro-1,4:5,8-dimethano-9,10 - anthraquinone dialkanesulfonimide starting material. In a preferred embodiment, cyclopentadiene and 5,8-dihydro-5,8-methano-1,4-naphthoquinone dialkanesulfonimide having the formula

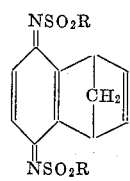

are allowed to react in the presence of a tertiary amine catalyst. In this procedure, the 1,4,4a,5,8,9a-hexahydro-1,4:5,8 - dimethano - 9,10 - anthraquinone disulfonimide compound is formed and immediately aromatized by the catalytic removal of a proton from each of the 4a and the 9a positions on the dimethano-9,10-anthraquinone nucleus. In carrying out this preferred embodiment, the reaction conditions and methods of separation are as set forth in the previous paragraphs.

The following examples are merely illustrative and are not to be construed as limiting.

*Example 1.—Synthesis of 1,4,5,8-tetrahydro-1,4:5,8-dimethano-9,10-anthracenedimethanesulfonamide*

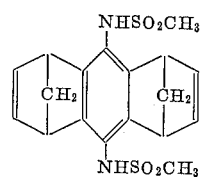

Triethylamine (6 drops) was added to a boiling solution of 1,4,4a5,8,9a-hexahydro-1,4:5,8-dimethano-9,10-anthraquinonedimethanesulfonimide (7.00 grams; 0.0178 mole) in 100 milliliters of chloroform. The resulting solution was heated with stirring at the reflux temperature for 32 hours. Following the refluxing period the reaction mixture was allowed to cool to room temperature. During the cooling period the 1,4,5,8-tetrahydro-1,4:5,8 - dimethano - 9,10 - anthracenedimethanesulfonamide product precipitated as a tan solid. This tan solid was recrystallized from dimethylformamide to give the product as a white solid which decomposed without melting at 300 to 320° C. The crystalline product was found to have carbon, hydrogen, and sulfur contents of 54.89 percent, 5.20 percent and 15.9 percent, respectively, as compared to the theoretical contents of 55.08 percent, 5.14 percent and 16.34 percent, respectively.

In the second procedure: cyclopentadiene (1.1 grams; 0.017 mole) was added with stirring to a solution of 5,8 - dihydro - 5,8 - methano - 1,4 - naphthoquinonedimethanesulfonimide (5.0 grams; 0.016 mole) and six drops of triethylamine in 200 milliliters of chloroform. The resulting solution was allowed to stand at room temperature for 20 minutes, and then concentrated to induce the crystallization of the 1,4,5,8-tetrahydro-1,4:5,8-dimethano - 9,10 - anthracenedimethanesulfonamide product. The product crystals were collected and recrystallized from nitromethane. The recrystallized product decomposed between 300 and 350° C. The infrared spectra of the products from both preparations were compared and found to be identical.

*Example 2.—1,4,5,8-tetrahydro-1,4:5,8-dimethano-9,10 anthracenedibutanesulfonamide*

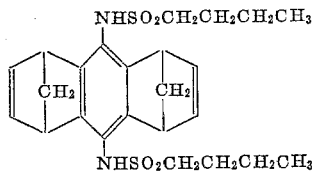

Cyclopentadiene (1.1 grams; 0.017 mole) and 5,8-dihydro - 5,8 - methano - 1,4 - naphthoquinonedibutanesulfonimide (6.5 grams; 0.013 mole) are dispersed with stirring in 200 milliliters of chloroform. This mixture is then maintained at room temperature for one-half hour. During that period trimethylamine catalyst is bubbled through the mixture. Following the reaction period the reaction mixture is concentrated and the solid 1,4,5,8-tetrahydro - 1,4:5,8 - dimethano - 9,10 - anthracenedibutanesulfonamide product collected. The product is recrystallized from nitromethane to yield the product as a crystalline solid molecular weight 506.5.

The compounds of the present invention can be employed in the preparation of compounds such as 1,4,5,8-tetrahydro - 1,4:5,8 - dimethano - 9,10 - anthraquinonedimethanesulfonimide, which has been found to be useful in the killing and control of plant fungi such as *Phytophthora infestans*, the causative agent of late blight. In the preparation of the sulfonimide the sulfonamide compound such as 1,4,5,8-tetrahydro-1,4:5,8-dimethano-9,10 - anthracenedimethanesulfonamide is oxidized with lead tetraacetate in the presence of a water-free inert organic solvent or glacial acetic acid as reaction medium. The reaction mixture is maintained at from 0 to 90° C. for a period of time to insure completion of the reaction. The crystalline solid product is then collected and purified by conventional methods.

In similar operations, carried out as described in Examples 1 and 2 except that N,N-diethylaniline, pyridine, lutidine, picoline and quinoline are employed as catalysts in place of triethylamine and trimethylamine and diethylsulfonimide and dipropylsulfonimide are employed as anthraquinone disulfonimide starting materials, very excellent yields of 1,4,5,8-tetrahydro-1,4:5,8-dimethano-9,10- anthracenediethanesulfonamide and 1,4,5,8-tetrahydro-1, 4:5,8 - dimethano - 9,10 - anthracenedipropanesulfonamide are obtained.

The 1,4,4a,5,8,9a - hexahydro - 1,4:5,8 - dimethano-9,10-anthraquinone disulfonimide starting materials such as the dipropanesulfonimide, diisobutanesulfonimide and the diethanesulfonimide employed in the present invention are prepared by reacting cyclopentadiene with a 5,8-dihydro - 5,8 - methano - 1,4 - naphthoquinone disulfonimide corresponding to the structure

The reaction is conveniently carried out in the presence of an inert organic solvent as reaction medium. The reaction mixture is maintained at a temperature between 0 and 110° C. for a short period of time. The solid product is collected and purified by conventional procedures.

The 5,8 - dihydro - 5,8 - methano - 1,4 - naphthoquinone disulfonimide compounds employed in the present invention can be prepared by reacting cyclopentadiene and a p-benzoquinone disulfonimide corresponding to the structure

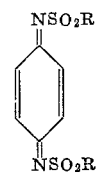

in the presence of a tertiary amine catalyst to produce the disulfonamide having the formula

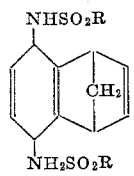

The reaction is conveniently carried out in the presence of an organic solvent as reaction medium. The reaction mixture is maintained at a temperature between 0 and 110° C. for a short period of time. The solid product is then collected and purified by conventional procedures. The disulfonamide is then oxidized to the disulfonimide with lead tetraacetate in glacial acetic acid.

I claim:

1. A compound corresponding to the formula

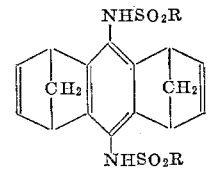

wherein R represents alkyl containing up to and including 4 carbon atoms.

2. 1,4,5,8 - tetrahydro - 1,4:5,8 - dimethano - 9,10 anthracenedimethanesulfonamide.

3. 1,4,5,8 - tetrahydro - 1,4:5,8 - dimethano - 9,10-anthracenediethanesulfonimide.

4. 1,4,5,8 - tetrahydro - 1,4:5,8 - dimethano - 9,10-anthracenedibutanesulfonimide.

5. 1,4,5,8 - tetrahydro - 1,4:5,8 - dimethano - 9,10-anthracenedipropanesulfonimide.

References Cited by the Examiner

UNITED STATES PATENTS 3,019,259    1/1962    Dunbar _____ 260—556

WALTER A. MODANCE, *Primary Examiner.*

HARRY I. MOATZ, *Assistant Examiner.*